US009787727B2

(12) United States Patent
Ahmed Assem Aly Salama et al.

(10) Patent No.: US 9,787,727 B2
(45) Date of Patent: Oct. 10, 2017

(54) VOIP CALL QUALITY

(71) Applicant: INTERNATIONAL BUSINESS MACHINES CORPORATION, Armonk, NY (US)

(72) Inventors: Hitham Ahmed Assem Aly Salama, Dublin (IE); Diaa Eldin Ali Mohamed Mahmoud Ali, Doha (QA); Christian B. Kau, Los Altos, CA (US); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 14/972,157

(22) Filed: Dec. 17, 2015

(65) Prior Publication Data

US 2017/0180430 A1  Jun. 22, 2017

(51) Int. Cl.
*H04L 12/66* (2006.01)
*H04L 29/06* (2006.01)
*H04M 7/00* (2006.01)
*H04L 29/12* (2006.01)

(52) U.S. Cl.
CPC ...... *H04L 65/1066* (2013.01); *H04L 61/1529* (2013.01); *H04L 65/403* (2013.01); *H04M 7/0072* (2013.01); *H04M 7/0084* (2013.01)

(58) Field of Classification Search
CPC ............... H04L 65/1066; H04L 65/403; H04L 61/1529; H04M 7/0072; H04M 7/0084
See application file for complete search history.

(56) References Cited

U.S. PATENT DOCUMENTS

| 6,687,234 | B1 * | 2/2004 | Shaffer | H04L 12/185 370/260 |
| 7,068,601 | B2 | 6/2006 | Abdelilah et al. | |
| 7,668,712 | B2 | 2/2010 | Wang et al. | |
| 2015/0092575 | A1 * | 4/2015 | Khay-Ibbat | H04L 65/602 370/252 |
| 2015/0200826 | A1 | 7/2015 | Assem et al. | |

FOREIGN PATENT DOCUMENTS

| CA | 2778240 A1 | 4/2011 |
| EP | 2120416 A1 | 11/2009 |
| WO | 2015117277 A1 | 8/2015 |

OTHER PUBLICATIONS

P. Mell et al., "The NIST Definition of Cloud Computing", National Institute of Standards and Technology, Information Technology Laboratory, Sep. 2011, pp. 1-7.

* cited by examiner

*Primary Examiner* — Afshawn Towfighi
(74) *Attorney, Agent, or Firm* — Law Office of Jim Boice (57) ABSTRACT

A method, system, and/or computer program product improve Voice over Internet Protocol (VoIP) call quality during a VoIP session. A VoIP session is established between an initial focus VoIP node and multiple slave VoIP nodes, where the initial focus VoIP node uses a first type of codec for the VoIP session. A user focus code score (UFCS) describes a VoIP call quality for each of the nodes based on predetermined network conditions related to use of a certain type of codec and nodal hardware specifications. The UFCSs are ranked to identify a highest-ranked VoIP node. The highest-ranked VoIP node is reclassified as a new focus VoIP node for the VoIP session, and the initial focus VoIP node is reclassified as a slave VoIP node. Thereafter, there is a simultaneous switching of 1) the focus and 2) the type of codec used in the VoIP session.

20 Claims, 10 Drawing Sheets

| USER ENDPOINT 1 | | | | | USER ENDPOINT 2 | | | |
|---|---|---|---|---|---|---|---|---|
| CODEC | C1 | C2 | C3 | | CODEC | C1 | C2 | C3 |
| UFCS | 3.7 | 4.1 | 2.9 | | UFCS | 2.7 | 3.4 | 4 |
| | | | | | | | | |
| USER ENDPOINT 3 | | | | | USER ENDPOINT 4 | | | |
| CODEC | C1 | C2 | C3 | | CODEC | C1 | C2 | C3 |
| UFCS | 4.2 | 3.7 | 3.2 | | UFCS | 4.3 | 2.7 | 3.9 |
| | | | | | | | | |
| USER ENDPOINT 5 | | | | | | | | |
| CODEC | C1 | C2 | C3 | | | | | |
| UFCS | 2.5 | 3.1 | 3.9 | | | | | |

| USER ENDPOINT | UFCS | CODEC |
|---|---|---|
| 1 | 4.1 | C2 |
| 2 | 4 | C3 |
| 3 | 4.2 | C1 |
| 4 | 4.3 | C2 |
| 5 | 3.9 | C3 |

VOIP CALL QUALITY

BACKGROUND

The present disclosure relates to the field of telecommunications, and specifically to the field of telecommunication that utilize Voice over Internet Protocol (VoIP). Still more specifically, the present disclosure relates to the field of improving call quality for calls made during a VoIP session.

Voice over Internet Protocol (VoIP) applications have gained wide acceptance by general Internet users and are increasingly important in the enterprise communications sector. However, achieving voice quality levels for VoIP remains a significant challenge, as IP networks typically do not guarantee delay, packet loss, jitter and bandwidth levels. In a VoIP application, voice is digitized and packetized at the sender before its transmission over the IP network to the receiver. At the receiver the packets are decoded and played out to the listener. The process of converting an analogue voice signal to digital is done by an audio "codec".

A codec is a coder-decoder (hence the name "codec") that converts an audio signal (e.g., a user's voice detected by a microphone) into a compressed digital form for transmission over a network during a VoIP session at a sending node (e.g., a computer-based telephone). A same type of codec at a receiving node receives the compressed digital transmission signal and converts it back into an uncompressed audio signal for replay at the receiving node. VoIP sessions may be between only two nodes (having only two parties to the VoIP session) or multi-receiver nodes (having multiple nodes receiving a same VoIP audio signal from a sending node).

SUMMARY

A method, system, and/or computer program product improve Voice over Internet Protocol (VoIP) call quality during a VoIP session. A VoIP session is established between an initial focus VoIP node and multiple slave VoIP nodes, where the initial focus VoIP node uses a first type of codec for the VoIP session. A user focus code score (UFCS) is retrieved from the initial focus VoIP node and each of the multiple slave VoIP nodes, where each UFCS describes a VoIP call quality for a particular VoIP node based on predetermined network conditions related to use of a certain type of codec available to the particular VoIP node, and where each UFCS further describes the VoIP call quality based on hardware specifications for the particular VoIP node. UFCSs for the initial focus VoIP node and each of the multiple slave VoIP nodes are ranked to identify a highest-ranked VoIP node that has a highest rated UFCS, where the highest rated UFCS is a due to the hardware specifications and a second type of codec that is available to the highest-ranked VoIP node. The highest-ranked VoIP node is reclassified as a new focus VoIP node for the VoIP session, and the initial focus VoIP node is reclassified as a slave VoIP node. Thereafter, there is a simultaneous switching of 1) the focus from the initial focus VoIP node to the new focus VoIP node and 2) use of the first type of codec to the second type of codec for use in the VoIP session.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
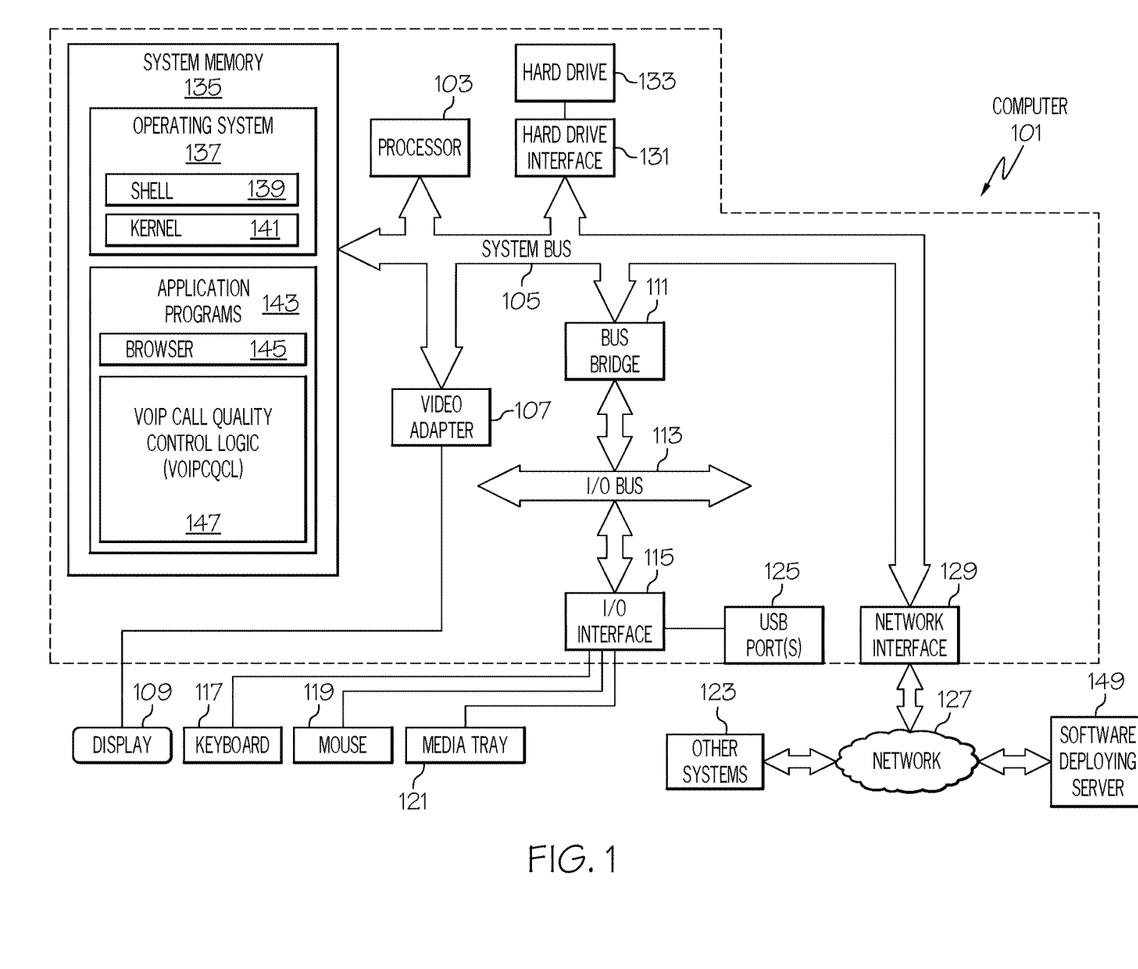
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 125 shown in FIG. 1, and/or systems (including, but not limited to, telecommunication systems) used by Users 1-5 in FIG. 2 and FIG. 7.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keypad 117, a mouse 119, a media tray 121 (which may include storage devices such as CD-ROM drives, multi-media interfaces, etc.), and external USB port (s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other systems 123 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Voice over Internet Protocol Call Quality Control Logic (VOIPCQCL) 147. VOIPCQCL 147 includes code for implementing the processes described below, including those described in FIGS. 2-8. In one embodiment, computer 101 is able to download VOIPCQCL 147 from software deploying server 149, including in an on-demand basis, wherein the code in VOIPCQCL 147 is not downloaded until needed for execution. In one embodiment of the present invention, software deploying server 149 performs all of the functions associated with the present invention (including execution of VOIPCQCL 147), thus freeing computer 101 from having to use its own internal computing resources to execute VOIPCQCL 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

VoIP performance depends on a number of network-related factors, including available bandwidth, end to-end delay, packet loss and jitter. Variance in these parameters often leads to degradation of VoIP performance and the Quality-of-Experience (QoE) perceived by end users. Moreover, other than network issues, application specific factors like the choice of codec, codec parameters, and jitter buffer sizing also impact QoE.

Codecs vary in bandwidth required, latency, sample period, frame size and the maximum achieved end user perceived quality, thus different codecs are better suited to different network conditions. Consequently, codec switching technique has been introduced in VoIP applications in order to make use of the different performance of codecs under different network conditions. Codec switching is often achieved via Session Initiation and Session Description Protocols (SIP/SDP). The initial session negotiation is achieved by a straightforward handshake protocol interaction wherein each peer exchanges an offer including the list of codecs it supports and a codec is selected. If one peer wishes to switch the code mid-session, it initiates a similar handshake procedure in order to select a new codec. In this scenario, both peers synchronize with each other in order to avoid data misinterpretation.

Implementers of VoIP applications often assess QoE as perceived by the end user and take mitigating actions when it degrades to unacceptable levels. Mean Opinion Score (MOS) is a metric to measure the QoE of a call as perceived directly by the end user. The MOS encapsulates the effects of both network and implementation specific issues, as described in further detail below.

Figure 2:
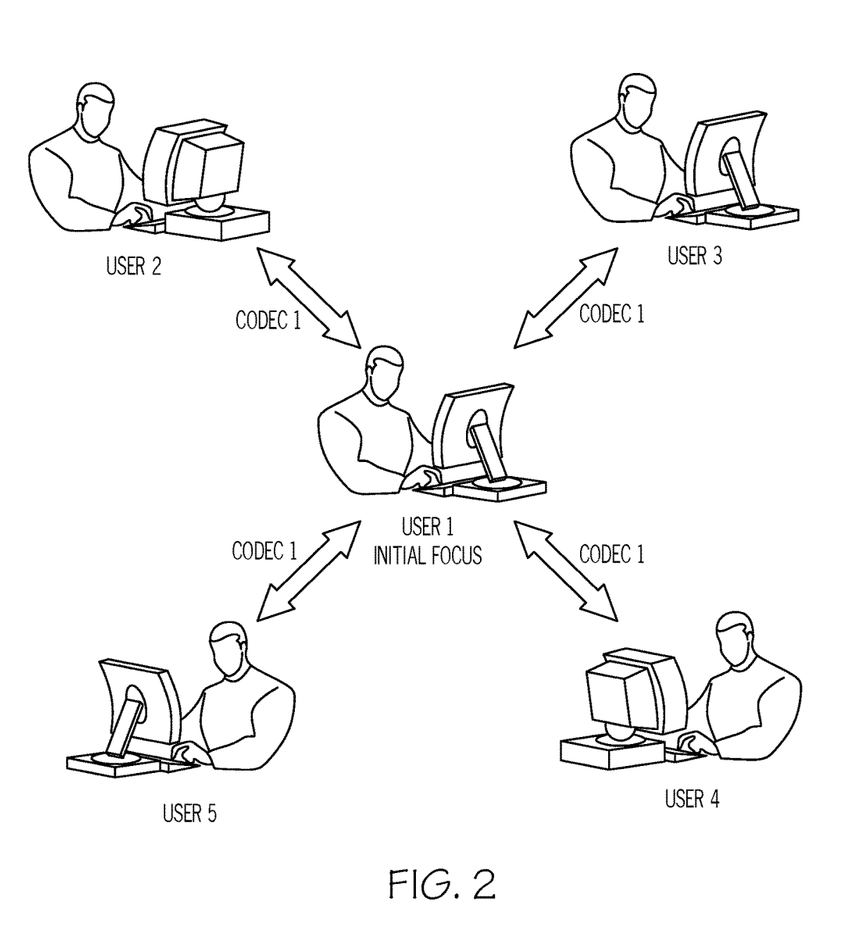
FIG. 2 illustrates an exemplary centralized model of a Voice over Internet Protocol (VoIP) session used in accordance with one or more embodiments of the present invention.

With reference now to FIG. 2, an exemplary centralized model 200 is used in designing VoIP multi-party conferencing systems and utilized in accordance with one or more embodiments of the present invention is presented. Each endpoint is connected directly to the focus, and it has no current knowledge of other connections between other endpoints and the focus. That is, the system (e.g., computer-based telephonic system) used by User 1 is the initial focus of the VoIP session, and communicates directly with the systems used by Users 2-5. The system used by User 1 (i.e., the "focus" system) can thus be viewed as a "master node", while the user systems used by Users 2-5 can be viewed as "slave nodes" in the VoIP session. Note that the systems used by Users 2-5 cannot communicate directly among themselves. Rather, communications among the systems used by Users 2-5, if any, must go through the focus (i.e., the "master node" that is the system used by User 1).

Multiple links to the focus are often subjected to different degradation factors. A centralized model is based on a central point of control called a focus (see above). The focus in most of cases is one of the conference endpoints. The focus is typically responsible for Session Initiation Protocol (SIP) signaling between all the conference endpoints. Moreover, all the transmitted audio data in the conference call must pass first through the focus to be decoded, mixed (if more than one user is speaking) and finally re-encoded and sent to the rest of endpoints.

One goal/feature of the present invention is to provide an innovative solution for improving the multi-party VoIP call quality. This is achieved via an adaptive mechanism to select dynamically and during the ongoing conference call the pair of {Focus, Codec} that will attain higher call quality for the conference participants. That is, the present invention does not just select and utilize a preferred focus, nor does it just select and utilize a preferred codec. Rather, the present invention utilizes a particular focus:codec pairing that is established by the processes described herein. Note that the focus and codec are interdependent upon one another, such that the optimal focus is determined based on the codec and hardware running on a particular node.

Thus, the presently presented mechanism considers the best pair of codec and user node that shows a highest value of a metric presented herein as the "User Focus Codec Score" (UFCS). This UFCS metric shows the expected call quality if a certain pairing of a particular node and a particular codec is used at the focus. In one or more implementations of the present invention, the UFCS ranges from 0-5, with "0" indicating the worst quality and "5" indicating the highest call quality that can be achieved. The intuition and details of the UFCS metric are described below.

In a preferred embodiment of the present invention, the system operates using two operating agents that cooperate together. These two agents are described as follows:

Focus Selection Agent "FSA". This agent is a software program running in a Master-Slave mode on every single user node involved in the multi-user call. This agent is running in a master mode on the focus node, while running in a slave mode on all other non-focus nodes. In a preferred embodiment, the slave mode of this agent is responsible for collecting the value of the UFCS, which is evaluated by the Score Evaluation Agent (the second agent—see below) at every single endpoint including the focus node.

Score Evaluation Agent "SEA". This agent is running on every single node incorporated in the call including the focus node. This agent is responsible for calculating the User Focus Code Score (UFCS).

Figure 3:
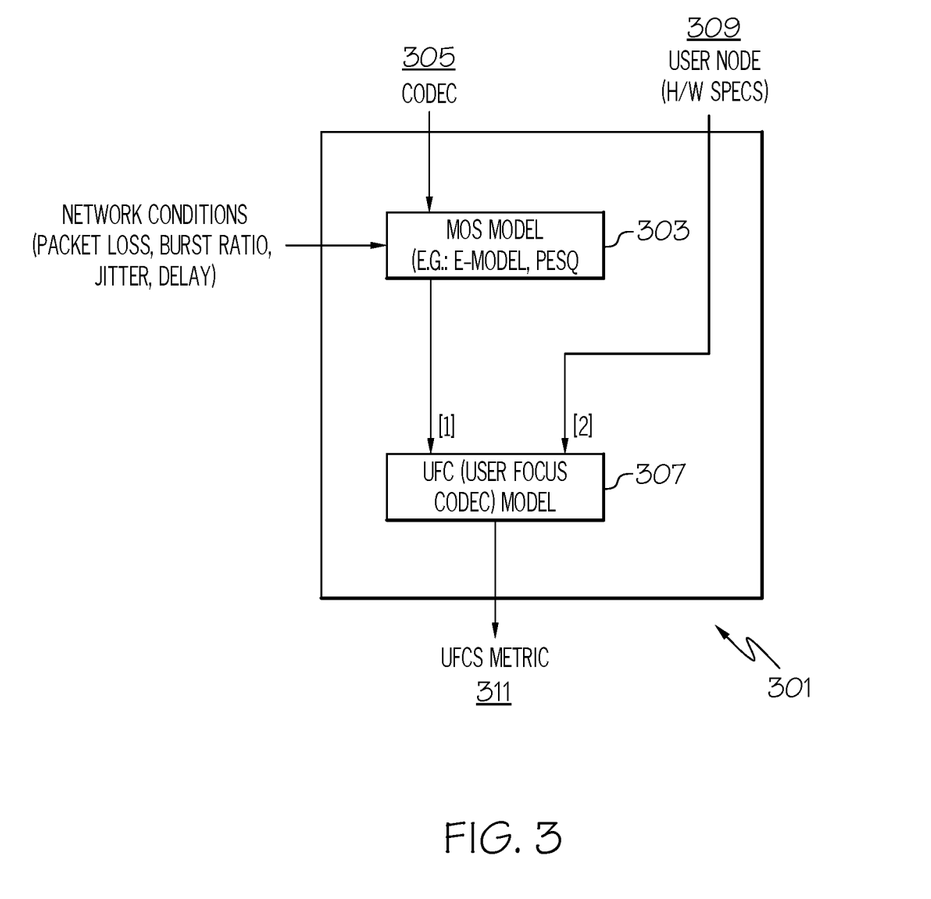
FIG. 3 depicts details for measuring a user focus code score (UFCS) in accordance with one or more embodiments of the present invention.

With reference now to FIG. 3, details for measuring/calculating the UFCS metric 311 in which the decision will be taken for using certain pair of codec and focus that is expected to increase the overall call experience is presented in model 301. Model 301 incorporates the use of a Mean Operating Score (MOS) model 303 and a User Focus Codec (UFC) model 307.

MOS Model 303: MOS model 303 shows the expected call quality from the usage of a particular type of codec 305 in a user node under certain network conditions. That is, the MOS model 303 describes the speech quality of codec 305 based just on the codec 305. For example, MOS model 303 may describe the Perceptual Evaluation of Speech Quality (PESQ) of the speech quality provided by coded 305, based on a test methodology that makes an automated assessment of the speech quality as experienced by a user of a telephony system (e.g., according to the ITU-T recommendation P.862 (02/01)). The MOS model 303 thus describes the amount of packet loss (e.g., "dropped" packets of VoIP packets), burst ratio (i.e., the ratio of the number of actual packets that are lost/dropped to the number of expected packets that are lost/dropped), jitter (i.e., the variation in packet transit delay (i.e., congestion) caused by queuing, contention and serialization effects on a path through the VoIP network), and delay (i.e., overall bottlenecks in packet transmission due to limited network and/or bus bandwidth, buffering, etc.).

UFC Model 307: UFC model 307 results in the expected call quality from using a certain codec under defined network condition (MOS model 303) [1] taking into account the User Node hardware specs 309 [2]. This model will result in what is referred to herein as the UFCS metric 311. The user node hardware specs 309 are the specification parameters for hardware, other than the codec, in a particular node, such as memory, processors, input/output (I/O) interfaces, etc.

Figure 4:
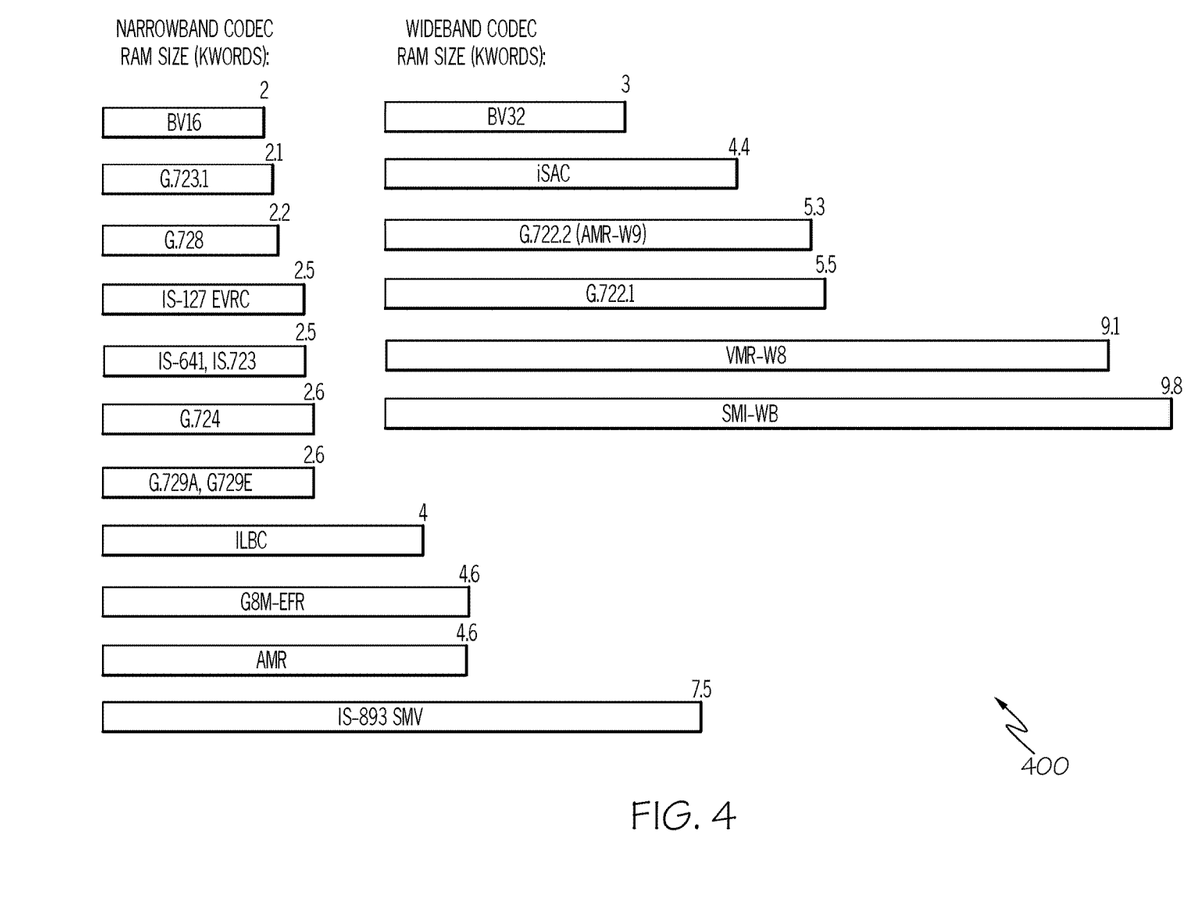
FIG. 4 illustrates performance improvements to a VoIP session call quality using the present invention.
Figure 5:
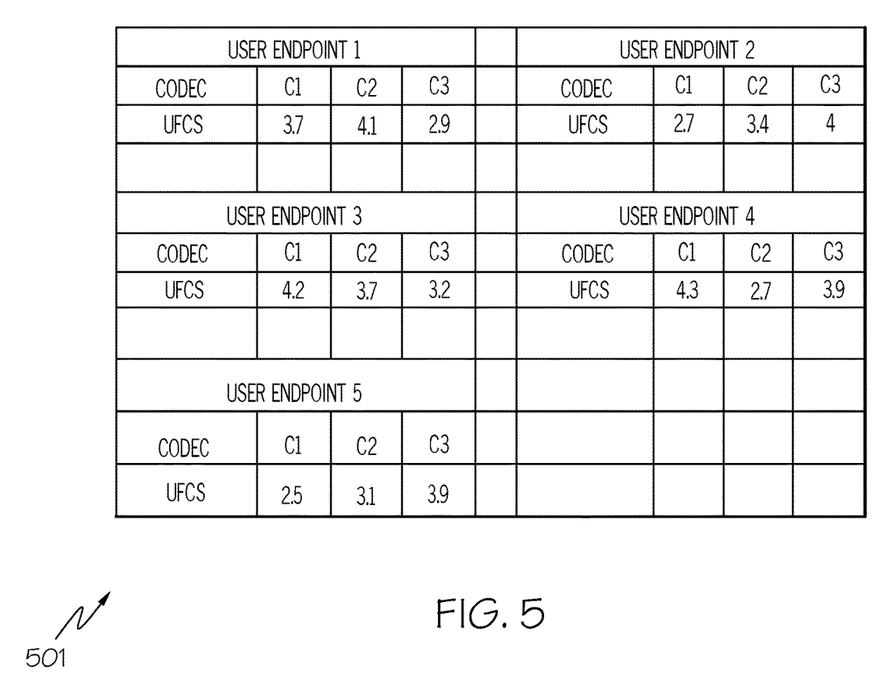
FIG. 5 depicts a table of UFCSs for different VoIP session user endpoints using various codecs.

As shown in table 400 in FIG. 4, the performance of codecs varies under different hardware resource environments. The present invention takes these differences into account. As shown in table 400, two codecs (a narrowband codec and a wideband codec) are compared according to the computational complexity of the codecs in terms of Million Instructions per Second (MIPS), the RAM memory requirement, and total memory footprint requirement on a typical 16-bit fixed-point commercial DSP. Table 400 in FIG. 4 thus shows how much the end user that acts as a focus requires in terms of free resources in order to efficiently do several iterations of decodings, re-encodings and then mixing (a significant burden on such conference end points). Thus switching a pair of codec with a focus provides an optimum solution for this problem as we propose in this disclosure.

In order to understand the effect of switching the focus between the users and the influence of this on the MOS of the whole conference, assume for explanatory purposes that there are five users in the conference call (as shown in FIG. 2) and that there are three codecs available in the package of the used VoIP application where:

Users={U1, U2, U1, U2, U1}
Codecs={C1, C2, C3}

FIG. 2 showed the initial configuration of a multi-user conference call between five users (Users 1-5). Assuming that the current conference call is using Codec 1 and User 1 is the initial focus node. Hence, all users will send their streams to User 1, where all streams will be decoded, mixed and then re-encoded and sent to all other participants (Users 2-5).

After a pre-set time interval T "e.g. 1 minute", the slave FSA (e.g., systems used by Users 2-5) running on every user endpoint will trigger the SEA to calculate and form a matrix of UFCS value for each codec supported by the VoIP application. This process will end up with a matrix in the form shown as table 501 in FIG. 5, which shows the UFCS for every user endpoint (including the focus) and for each of the codecs C1-C3. That is, in FIG. 5 the depicted User Endpoints 1-5 are equivalent to the vector {U1, U2, U1, U2, U1} just introduced. Available to each of the User Endpoints 1-5 are the codecs {C1, C2, C3}.

The slave FSA (running on one of the systems used by one of Users 2-5) will pick the pair {UFCS, Codec} with the highest UFCS value on every user endpoint. (In an alternatively embodiment, the master FSA (running on the initial focus node used by User 1) will pick the {UFCS, Codec} pair.)

The master FSA, which is running on the current initial focus, will broadcast a message to all endpoints to fetch their elected pair of {UFCS, Codec}.

Figure 6:
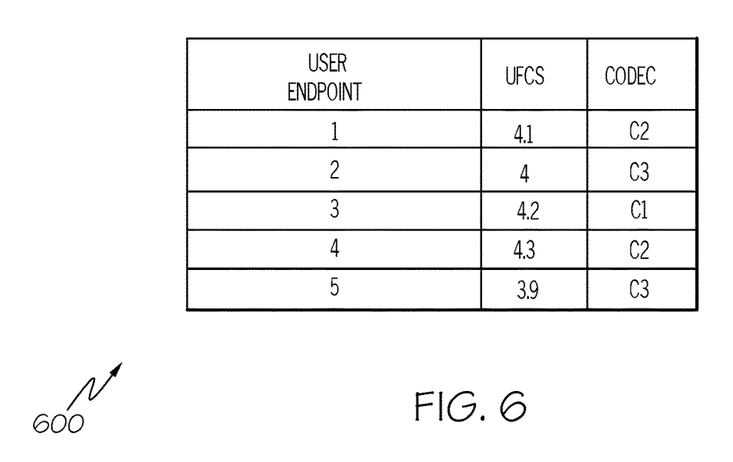
FIG. 6 illustrates a ranking of USCFs from different VoIP session user endpoints using specific codecs.

The master FSA will then collect the {UFCS, Codec} pair values and choose the user endpoint with the highest UFCS score to be nominated for the new focus and codec as shown in table 600 in FIG. 6. In the example shown in FIG. 6, User Endpoint 4 has the highest UFCS 4.3 when using codec C2.

Once the new focus is determined, the master FSA will send a "change of focus" message to the slave FSA running on the candidate user endpoint (e.g. User Endpoint 4 (i.e., the system used by User 4 in FIG. 2) in this example).

Once the "change of focus" message is received by the slave FSA running in the nominate user endpoint, it will change its own mode to a master mode and send back a confirmation message to the previous focus to handshake the successful change of focus. Once confirmed, the previous master will change mode to slave accordingly.

Figure 7:
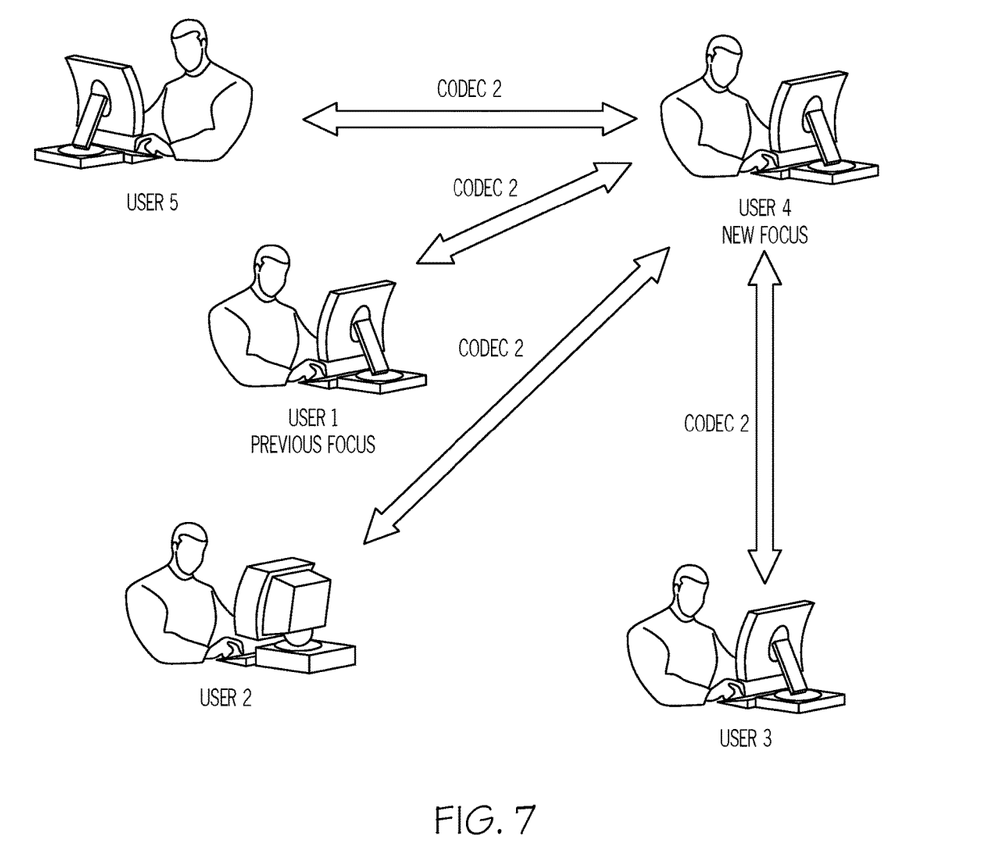
FIG. 7 depicts an improved configuration after simultaneous focus/codec switching in accordance with one or more embodiments of the present invention.

Once the focus change process is complete, the new master FSA (i.e., running on the system used by User 4 as shown in FIG. 7) will broadcast a message to all participating user endpoints (e.g., systems used by Users 1-3 and User 5) in a call informing them about both the focus change and the codec change to start operating accordingly.

Thus, as shown in FIG. 7, the new configuration after switching to User 4 as the new focus and switching to Codec 2 as the new codec is presented.

Figure 8:
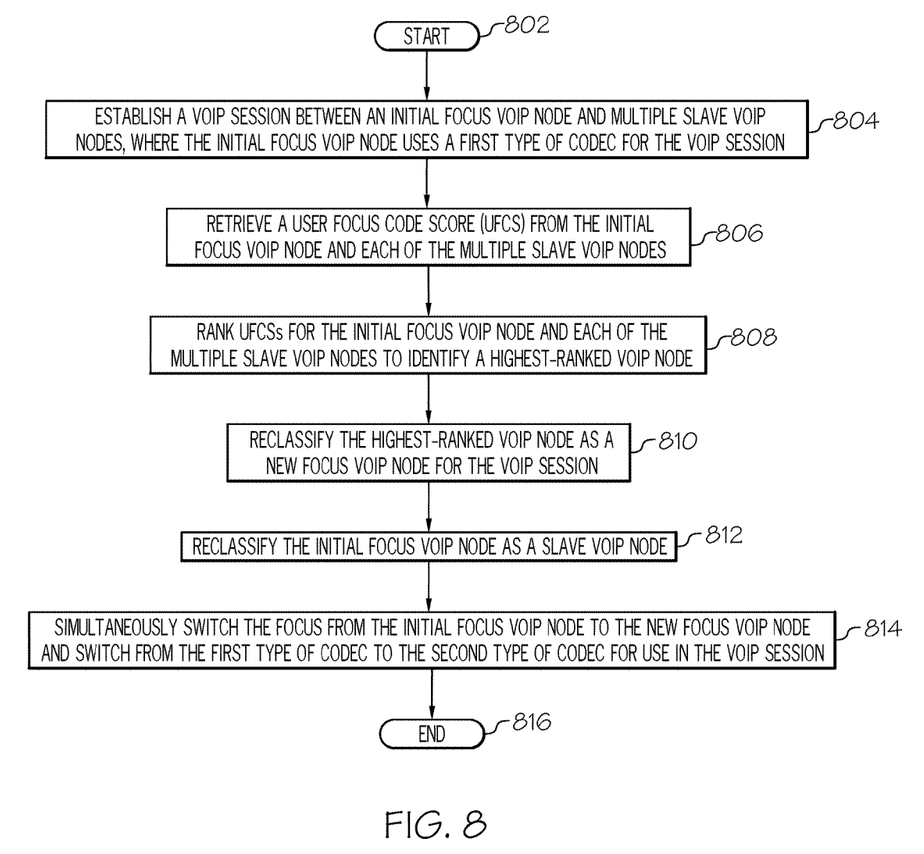
FIG. 8 is a high-level flow chart of one or more steps performed by one or more processors and/or other hardware devices to improve a VoIP session.

With reference now to FIG. 8, a high-level flow chart of one or more steps performed by one or more processors and/or other hardware devices to improve a VoIP session is presented.

After initiator block 802, one or more processors (e.g., within the computer/telecommunication systems used by two or more of the User's 1-5 shown in FIG. 2) establish a VoIP session between an initial focus VoIP node (e.g., the initial focus provided by the computer/telecommunication system used by User 1 in FIG. 2) and multiple slave VoIP nodes (e.g., computer/telecommunication systems used by one or more of Users 2-5 shown in FIG. 2), as described in block 804. As shown in FIG. 2, the initial focus VoIP node uses a first type of codec ("Codec 1") for the VoIP session.

As described in block 806, one or more processors (preferably in one of the slave nodes but alternatively in the initial focus node) retrieves a user focus code score (UFCS) from the initial focus VoIP node and each of the multiple slave VoIP nodes. As described herein, each UFCS describes a VoIP call quality for a particular VoIP node based on predetermined network conditions related to use of a certain type of codec available to the particular VoIP node (i.e., the MOS model 303 shown in FIG. 3), and each UFCS further describes the VoIP call quality based on hardware specifications for the particular VoIP node (i.e., the user node hardware specs 309 shown in FIG. 2). These combined together in the UFC model 307 shown in FIG. 3 to produce the UFCS, shown in FIG. 3 as the UFCS metric 311.

As described in block 808, one or more processors (e.g., from one of the slave VoIP nodes used by one of Users 2-5 shown in FIG. 2) rank UFCSs for the initial focus VoIP node and each of the multiple slave VoIP nodes to identify a highest-ranked VoIP node that has a highest rated UFCS. As shown in table 600 in FIG. 6, the highest rated UFCS (e.g., user endpoint 4 for the slave node used by User 4) is a due to the hardware specifications and a second type of codec that is available to the highest-ranked VoIP node.

Based on this highest user endpoint ranking and as described in block 810, one or more processors (e.g., from one of the slave VoIP nodes) reclassifies the highest-ranked VoIP node (e.g., user endpoint 4) as a new focus VoIP node for the VoIP session, and reclassifies the initial focus VoIP node (for User 1 in FIG. 1) as a slave VoIP node (see block 812).

As described in block 814, the processor(s) then simultaneously 1) switch the focus from the initial focus VoIP node to the new focus VoIP node and 2) switch from the first type of codec to the second type of codec for use in the VoIP session. That is, as shown in FIG. 7, the new focus VoIP node is now the (previously slave) VoIP node used by User 4, and the codec used in the VoIP session has simultaneously switched from Codec 1 to Codec 2.

The flow chart ends at terminator block 816.

As described in FIG. 3, one or more processors calculate, for each of the initial focus VoIP node and the multiple slave nodes, the predefined network conditions based on a mean opinion score (MOS) for a particular codec in each of the initial focus VoIP node and the multiple slave nodes, where the MOS is based on expected packet loss, burst ratio, jitter, and delay associated with the particular codec.

As also described in FIG. 3, one or more processors retrieve, for each of the initial focus VoIP node and the multiple slave nodes, the hardware specifications for each processor used in the initial focus VoIP node and the multiple slave nodes.

As also described in FIG. 3, one or more processors retrieve, for each of the initial focus VoIP node and the multiple slave nodes, the hardware specifications for each network interface used in the initial focus VoIP node and the multiple slave nodes.

In an alternatively embodiment, the retrieving, ranking, reclassifying, and simultaneously switching operations shown in FIG. 8 are performed by a focus selection agent (FSA) running on the initial focus VoIP node (e.g., the initial focus VoIP node associated with User 1 in FIG. 2). However, in a preferred embodiment, the retrieving, ranking, reclassifying, and simultaneously switching operations described in FIG. 8 are performed by a focus selection agent (FSA) running on one of the multiple slave VoIP nodes (i.e., one of the slave VoIP nodes used by Users 2-5 in FIG. 2).

As described herein, in one or more embodiments the UFCS is calculated by a score evaluation agent (SEA) running on each of the initial focus VoIP node and the multiple slave VoIP nodes.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
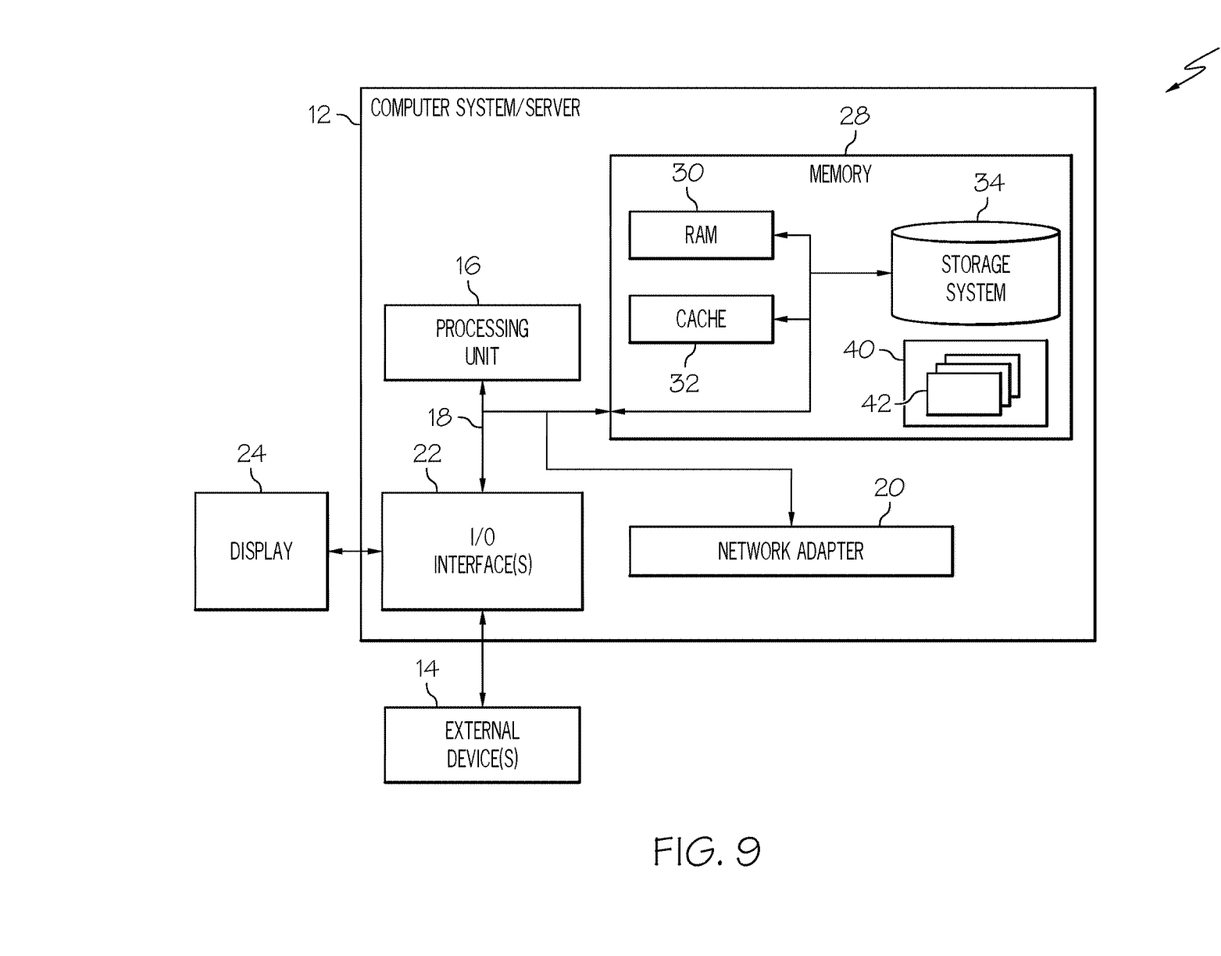
FIG. 9 depicts a cloud computing node according to an embodiment of the present disclosure.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
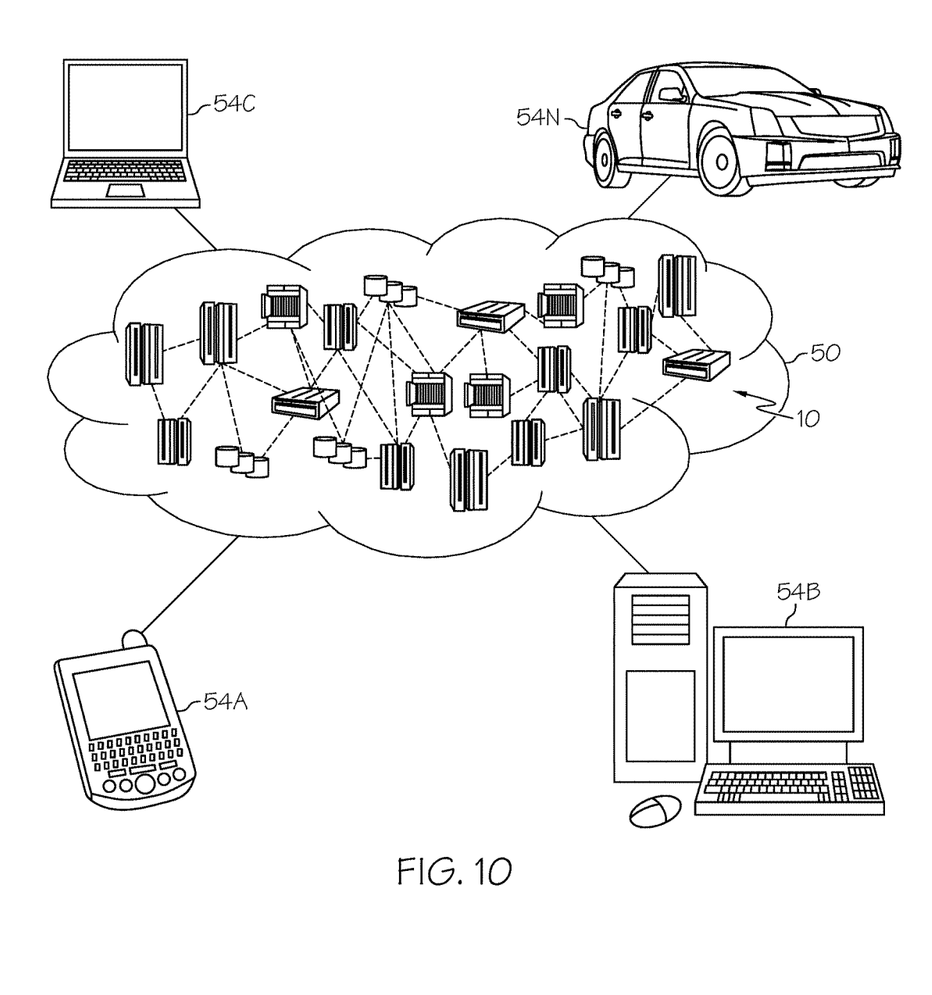
FIG. 10 depicts a cloud computing environment according to an embodiment of the present disclosure.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
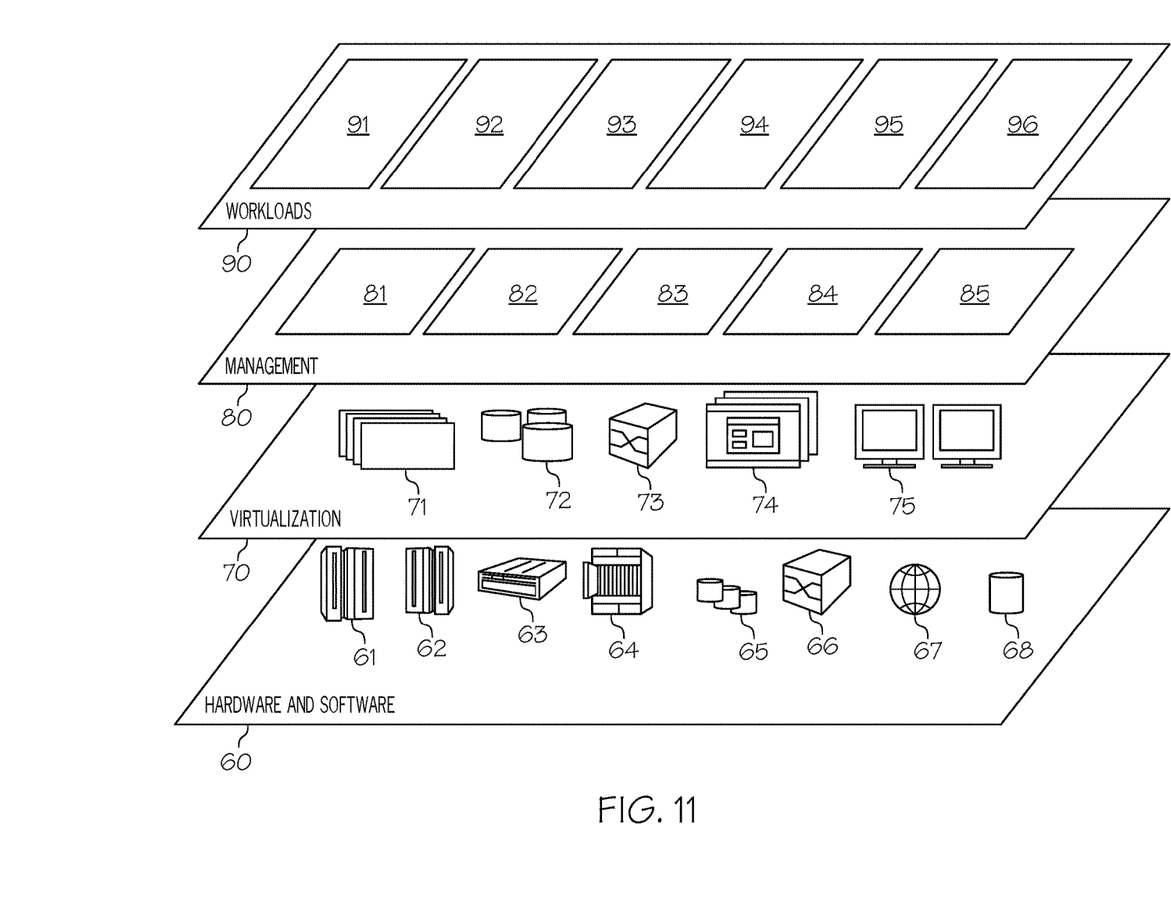
FIG. 11 depicts abstraction model layers according to an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VoIP session processing 96 (for improving VoIP call quality as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of improving Voice over Internet Protocol (VoIP) call quality during a VoIP session, the method comprising:
    establishing, by one or more processors, a VoIP session between an initial focus VoIP node and multiple slave VoIP nodes, wherein the initial focus VoIP node uses a first type of codec for the VoIP session;
    retrieving, by one or more processors, a user focus code score (UFCS) from the initial focus VoIP node and each of the multiple slave VoIP nodes, wherein each UFCS describes a VoIP call quality for a particular VoIP node based on predetermined network conditions related to use of a certain type of codec available to the particular VoIP node, and wherein each UFCS further describes the VoIP call quality based on hardware specifications for the particular VoIP node;

ranking, by one or more processors, UFCSs for the initial focus VoIP node and each of the multiple slave VoIP nodes to identify a highest-ranked VoIP node that has a highest rated UFCS, wherein the highest rated UFCS is a due to the hardware specifications and a second type of codec that is available to the highest-ranked VoIP node;

reclassifying, by one or more processors, the highest-ranked VoIP node as a new focus VoIP node for the VoIP session;

reclassifying, by one or more processors, the initial focus VoIP node as a slave VoIP node; and simultaneously switching, by one or more processors, the focus from the initial focus VoIP node to the new focus VoIP node and switching, by one or more processors, from the first type of codec to the second type of codec for use in the VoIP session.

2. The method of claim 1, further comprising:
calculating, by one or more processors and for each of the initial focus VoIP node and the multiple slave nodes, the predefined network conditions based on a mean opinion score (MOS) for a particular codec in each of the initial focus VoIP node and the multiple slave nodes, wherein the MOS is based on expected packet loss, burst ratio, jitter, and delay associated with the particular codec.

3. The method of claim 1, further comprising:
retrieving, by one or more processors and for each of the initial focus VoIP node and the multiple slave nodes, the hardware specifications for each processor used in the initial focus VoIP node and the multiple slave nodes.

4. The method of claim 1, further comprising:
retrieving, by one or more processors and for each of the initial focus VoIP node and the multiple slave nodes, the hardware specifications for each network interface used in the initial focus VoIP node and the multiple slave nodes.

5. The method of claim 1, wherein the retrieving, ranking, reclassifying, and simultaneously switching are performed by a focus selection agent (FSA) running on the initial focus VoIP node.

6. The method of claim 1, wherein the retrieving, ranking, reclassifying, and simultaneously switching are performed by a focus selection agent (FSA) running on one of the multiple slave VoIP nodes.

7. The method of claim 1, wherein the UFCS is calculated by a score evaluation agent (SEA) running on each of the initial focus VoIP node and the multiple slave VoIP nodes.

8. A computer program product for improving Voice over Internet Protocol (VoIP) call quality during a VoIP session, the computer program product comprising a non-transitory computer readable storage medium having program code embodied therewith, the program code readable and executable by a processor to perform a method comprising:

establishing a VoIP session between an initial focus VoIP node and multiple slave VoIP nodes, wherein the initial focus VoIP node uses a first type of codec for the VoIP session;

retrieving a user focus code score (UFCS) from the initial focus VoIP node and each of the multiple slave VoIP nodes, wherein each UFCS describes a VoIP call quality for a particular VoIP node based on predetermined network conditions related to use of a certain type of codec available to the particular VoIP node, and wherein each UFCS further describes the VoIP call quality based on hardware specifications for the particular VoIP node;

ranking UFCSs for the initial focus VoIP node and each of the multiple slave VoIP nodes to identify a highest-ranked VoIP node that has a highest rated UFCS, wherein the highest rated UFCS is a due to the hardware specifications and a second type of codec that is available to the highest-ranked VoIP node;

reclassifying the highest-ranked VoIP node as a new focus VoIP node for the VoIP session;

reclassifying the initial focus VoIP node as a slave VoIP node; and simultaneously switching the focus from the initial focus VoIP node to the new focus VoIP node and switching from the first type of codec to the second type of codec for use in the VoIP session.

9. The computer program product of claim 8, wherein the method further comprises:
calculating, for each of the initial focus VoIP node and the multiple slave nodes, the predefined network conditions based on a mean opinion score (MOS) for a particular codec in each of the initial focus VoIP node and the multiple slave nodes, wherein the MOS is based on expected packet loss, burst ratio, jitter, and delay associated with the particular codec.

10. The computer program product of claim 8, wherein the method further comprises:
retrieving, for each of the initial focus VoIP node and the multiple slave nodes, the hardware specifications for each processor used in the initial focus VoIP node and the multiple slave nodes.

11. The computer program product of claim 8, wherein the method further comprises:
retrieving, for each of the initial focus VoIP node and the multiple slave nodes, the hardware specifications for each network interface used in the initial focus VoIP node and the multiple slave nodes.

12. The computer program product of claim 8, wherein the retrieving, ranking, reclassifying, and simultaneously switching are performed by a focus selection agent (FSA) running on the initial focus VoIP node.

13. The computer program product of claim 8, wherein the retrieving, ranking, reclassifying, and simultaneously switching are performed by a focus selection agent (FSA) running on one of the multiple slave VoIP nodes.

14. The computer program product of claim 8, wherein the UFCS is calculated by a score evaluation agent (SEA) running on each of the initial focus VoIP node and the multiple slave VoIP nodes.

15. A computer system comprising:
a processor, a computer readable memory, and a non-transitory computer readable storage medium;

first program instructions to establish a VoIP session between an initial focus VoIP node and multiple slave VoIP nodes, wherein the initial focus VoIP node uses a first type of codec for the VoIP session;

second program instructions to retrieve a user focus code score (UFCS) from the initial focus VoIP node and each of the multiple slave VoIP nodes, wherein each UFCS describes a VoIP call quality for a particular VoIP node based on predetermined network conditions related to use of a certain type of codec available to the particular VoIP node, and wherein each UFCS further describes the VoIP call quality based on hardware specifications for the particular VoIP node;

third program instructions to rank UFCSs for the initial focus VoIP node and each of the multiple slave VoIP nodes to identify a highest-ranked VoIP node that has a highest rated UFCS, wherein the highest rated UFCS is a due to the hardware specifications and a second type of codec that is available to the highest-ranked VoIP node;

fourth program instructions to reclassify the highest-ranked VoIP node as a new focus VoIP node for the VoIP session;

fifth program instructions to reclassify the initial focus VoIP node as a slave VoIP node; and sixth program instructions to simultaneously switch the focus from the initial focus VoIP node to the new focus VoIP node and switching from the first type of codec to the second type of codec for use in the VoIP session; and wherein the first, second, third, fourth, fifth, and sixth program instructions are stored on the non-transitory computer readable storage medium for execution by one or more processors via the computer readable memory.

16. The computer system of claim 15, further comprising:
seventh program instructions to calculate, for each of the initial focus VoIP node and the multiple slave nodes, the predefined network conditions based on a mean opinion score (MOS) for a particular codec in each of the initial focus VoIP node and the multiple slave nodes, wherein the MOS is based on expected packet loss, burst ratio, jitter, and delay associated with the particular codec; and wherein
the seventh program instructions are stored on the non-transitory computer readable storage medium for execution by one or more processors via the computer readable memory.

17. The computer system of claim 15, further comprising:
seventh program instructions to retrieve, for each of the initial focus VoIP node and the multiple slave nodes, the hardware specifications for each processor used in the initial focus VoIP node and the multiple slave nodes; and wherein
the seventh program instructions are stored on the non-transitory computer readable storage medium for execution by one or more processors via the computer readable memory.

18. The computer system of claim 15, further comprising:
seventh program instructions to retrieve, for each of the initial focus VoIP node and the multiple slave nodes, the hardware specifications for each network interface used in the initial focus VoIP node and the multiple slave nodes; and wherein
the seventh program instructions are stored on the non-transitory computer readable storage medium for execution by one or more processors via the computer readable memory.

19. The computer system of claim 15, wherein the retrieving, ranking, reclassifying, and simultaneously switching are performed by a focus selection agent (FSA) running on the initial focus VoIP node.

20. The computer system of claim 15, wherein the UFCS is calculated by a score evaluation agent (SEA) running on each of the initial focus VoIP node and the multiple slave VoIP nodes.

* * * * *